F. COWAN.
ANIMAL-TRAP.
No. 192,569. Patented July 3, 1877.
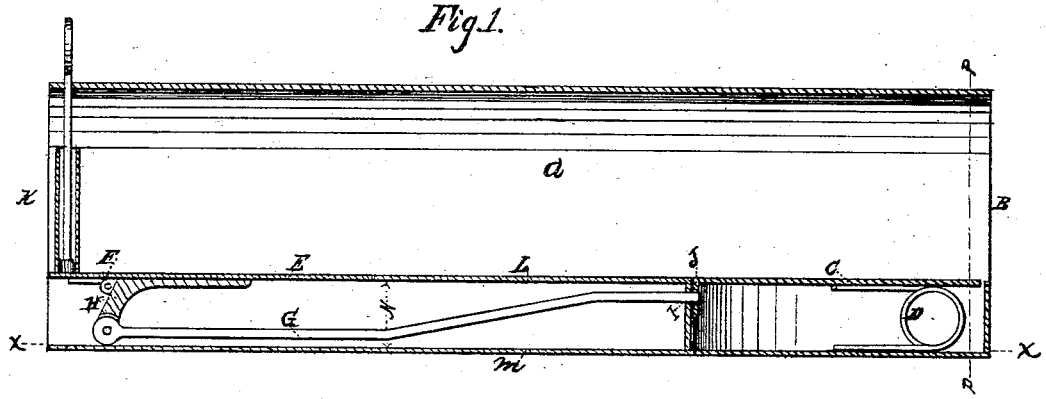
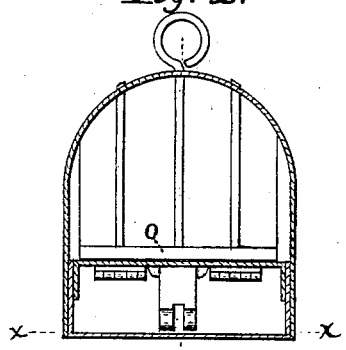
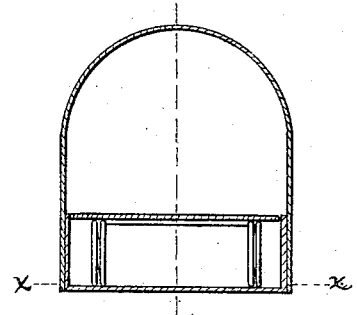
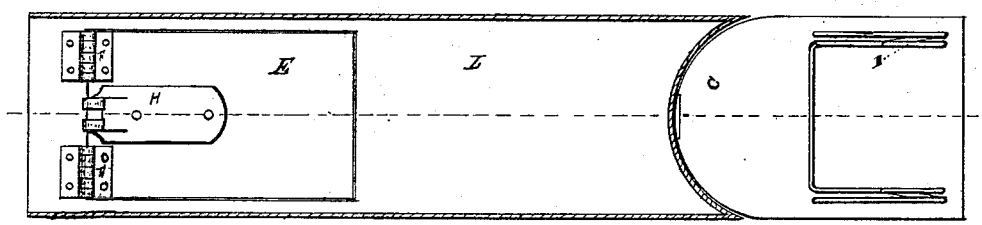
Attest:
Chas. Halladay
Philip E. Brooks
Inventor:
Francis Cowan

UNITED STATES PATENT OFFICE.

FRANCIS COWAN, OF CHICAGO, ILLINOIS.

IMPROVEMENT IN ANIMAL-TRAPS.

Specification forming part of Letters Patent No. 192,569, dated July 3, 1877; application filed April 23, 1877.

*To all whom it may concern:*

Be it known that I, FRANCIS COWAN, of the city of Chicago, county of Cook, State of Illinois, have invented a new combined Gopher, Ground-Squirrel, and Rat Trap, which is more fully set forth in the following specification and accompanying drawings, in which—

Figure 1 is a longitudinal section view of Figs. 2, 3, and 4 at dotted lines, showing interior of trap, and trigger-case set ready for use; Fig. 2, end view of trap at K, showing sliding grate O, and end view of angular knee H; Fig. 3, sectional view of Fig. 1 at dotted line P P; Fig. 4, under view of bottom L, showing under side of spring-door C, trigger E, hinges F F, angular knee H, and door-spring D.

The object of my invention is to furnish a sure-acting trap for that class of animals that burrow in the ground.

In the drawings, *a* is a tunnel-shaped metal pipe, having parallel sides, arched roof, and flat bottom, and wherever in the following specification I have occasion to refer to it I will designate it as the trap-tunnel; B, front or open end of trap-tunnel; D, combination hinge and spring of door C; E, rectangular treadle-trigger in the bottom of trap-tunnel; F, trigger-hinge; G, horizontal trigger-bar; H, angular knee for bar-joint; I, trigger-bar guide; J, door-lip; K, back end of trap-tunnel; L, bottom of trap-tunnel; M, bottom of trigger-case; N, space between trigger-case and trap-tunnel; O, sliding grate.

It will be seen from the foregoing that when the animal enters the trap-tunnel *a* at the end B, and passes along the arched way toward the end K, it treads on the rectangular hinged trigger E, the loose end of which, feeling the weight of the animal, falls down. The angular knee H being fastened to the trigger at right angles to its plane, and the horizontal trigger-bar G being jointed to the knee, the falling of the forward end of the trigger carries the knee-joint back, and draws the trigger-bar with it through the guide I, and out of the door-lip J, releasing the door C, which, being acted upon by the combined spring and hinge D, flies up, and the trap is closed. The end of the trap K is closed with a sliding grate, O, to be used for the purpose of getting the animal out of the trap after being caught.

These traps may be so constructed that the horizontal trigger-bar, in connection with a spiral spring, may be used on the top of the trap-tunnel in place of the bottom, as shown in the present drawings. In the latter the door flies up, and in the former it falls down.

The traps may be made any size to suit the animals intended to be caught. For gophers, or animals of that size, they will be made about fifteen inches long; the trap-tunnel about three inches high; trigger-case one inch deep and three inches wide.

Having thus described my invention, what I claim as new, and desire to secure by Letters Patent, is—

The combination of the horizontal trigger-bar G, and the tunnel-shaped metal pipe *a*, with the trigger E, and the spring-door C acting at opposite ends of the trap, substantially as described.

FRANCIS COWAN.

Witnesses:
  PHILIP E. HOOKEY,
  CHAS. HALLADAY.